United States Patent
Barnes et al.

(10) Patent No.: US 9,576,234 B2
(45) Date of Patent: Feb. 21, 2017

(54) METHOD AND SYSTEM FOR POWER MANAGEMENT OF ASSET TRACKING SYSTEM FOR NON-STATIONARY ASSETS

(71) Applicant: TRAPEZE SOFTWARE ULC, Mississauga (CA)

(72) Inventors: Sharon Ann Irma Barnes, Kelowna (CA); Marty Charles Brooks, Kelowna (CA)

(73) Assignee: TRAPEZE SOFTWARE ULC, Mississauga (CA)

( * ) Notice: Subject to any disclaimer, the term of this patent is extended or adjusted under 35 U.S.C. 154(b) by 269 days.

(21) Appl. No.: 14/095,689

(22) Filed: Dec. 3, 2013

(65) Prior Publication Data

US 2015/0154427 A1    Jun. 4, 2015

(51) Int. Cl.
| | | |
|---|---|---|
| *H04Q 5/22* | (2006.01) | |
| *G05B 11/01* | (2006.01) | |
| *G08C 19/12* | (2006.01) | |
| *B60Q 1/26* | (2006.01) | |
| *G08B 21/00* | (2006.01) | |
| *G08B 1/00* | (2006.01) | |
| *G06K 19/07* | (2006.01) | |
| *G06K 19/073* | (2006.01) | |
| *G06Q 10/08* | (2012.01) | |

(52) U.S. Cl.
CPC ....... *G06K 19/0701* (2013.01); *G06K 19/0717* (2013.01); *G06K 19/0723* (2013.01); *G06K 19/07345* (2013.01); *G06Q 10/0833* (2013.01)

(58) Field of Classification Search
CPC ............ G06K 7/10009; G06K 19/0705; G06K 19/0723;G06K 19/0716; G06K 17/0022; G06K 19/0702; G06K 19/0717; G06K 2017/0045; G06K 7/10366; G06Q 10/087; G06Q 10/08; G06Q 10/0833; G06Q 10/083; G08B 13/1436; G08B 21/0275
See application file for complete search history.

(56) References Cited

U.S. PATENT DOCUMENTS

| | | | | |
|---|---|---|---|---|
| 5,305,459 A | * | 4/1994 | Rydel | G06F 1/32 235/375 |
| 6,411,567 B1 | * | 6/2002 | Niemiec | A61J 7/0481 368/10 |
| 7,541,942 B2 | * | 6/2009 | Cargonja | G07C 9/00111 235/384 |
| 7,956,725 B2 | | 6/2011 | Smith | |
| 7,956,746 B2 | * | 6/2011 | Truscott | G08B 13/06 340/572.1 |

(Continued)

*Primary Examiner* — Steven Lim
*Assistant Examiner* — Muhammad Adnan
(74) *Attorney, Agent, or Firm* — Elan IP Inc.

(57) ABSTRACT

There is system for power management for radio frequency identification (RFID) tag asset tracking systems where the tag has a transceiver, configured to control RFID communication of the RFID tag, an accelerometer, configured to determine and communicate whether the tag is in motion and a microcontroller unit (MCU), to control operation of the RFID tag and operably connected to, and in communication with, the accelerometer and the transceiver, wherein the MCU awakens, based on a trigger and receives, from the accelerometer, whether the accelerometer is moving, and if it is moving then provide power to other parts of the tag, otherwise transition to a sleep mode to conserve power.

6 Claims, 3 Drawing Sheets

(56) References Cited

U.S. PATENT DOCUMENTS

| | | | | |
|---|---|---|---|---|
| 8,102,271 | B2* | 1/2012 | Heo | G01S 13/878 |
| | | | | 340/5.91 |
| 8,339,244 | B2* | 12/2012 | Peden, II | G06K 17/0022 |
| | | | | 235/375 |
| 8,532,718 | B2* | 9/2013 | Behzad | H04W 52/0229 |
| | | | | 455/343.2 |
| 2006/0202804 | A1* | 9/2006 | Vijay-Pillai | G06K 19/0705 |
| | | | | 340/10.33 |
| 2009/0309704 | A1 | 12/2009 | Chang et al. | |
| 2010/0295665 | A1* | 11/2010 | Landau | G06Q 10/087 |
| | | | | 340/10.42 |
| 2011/0030875 | A1* | 2/2011 | Conte | G01V 15/00 |
| | | | | 156/64 |
| 2011/0077909 | A1* | 3/2011 | Gregory | G01D 9/005 |
| | | | | 702/187 |
| 2011/0187537 | A1* | 8/2011 | Touchton | G08B 23/00 |
| | | | | 340/573.3 |
| 2012/0092132 | A1* | 4/2012 | Holme | A01K 11/008 |
| | | | | 340/10.1 |
| 2012/0126946 | A1* | 5/2012 | Balareta | G06K 19/0705 |
| | | | | 340/10.1 |
| 2012/0319503 | A1* | 12/2012 | Johnson | H04N 5/4403 |
| | | | | 307/119 |
| 2013/0041623 | A1* | 2/2013 | Kumar | G01C 21/14 |
| | | | | 702/158 |
| 2013/0120118 | A1 | 5/2013 | Moshfeghi | |
| 2014/0225735 | A1* | 8/2014 | Hosseini | G08B 13/2451 |
| | | | | 340/572.1 |
| 2015/0002274 | A1* | 1/2015 | Sengstaken, Jr. | G06K 7/10009 |
| | | | | 340/10.34 |

* cited by examiner

US 9,576,234 B2

METHOD AND SYSTEM FOR POWER MANAGEMENT OF ASSET TRACKING SYSTEM FOR NON-STATIONARY ASSETS

FIELD OF THE INVENTION

The present invention relates generally to radio frequency identification power management. More particularly, the present invention relates to a method and system for managing power for the use of radio frequency identification on assets that are transition or toggle between stationary and non-stationary states.

BACKGROUND OF THE INVENTION

The use of radio frequency identification (RFID) tags to assist with asset management is known. Placing RFID tags on assets allows for constant tracking of an asset's location and status. But these systems often have issues regarding power consumption, as transmitting information, and constantly waiting to receive information, can be quite power intensive for the RFID tag. This issue becomes even more severe when the asset management system is being used in an environment where the assets themselves might constantly or frequently be moving.

One example of this sort of situation arises in the transit field. Transit officials may use asset management systems with RFID tags to track their vehicles. But as the vehicles can often be stationary in the transit bay, for example overnight when transit operations are not occurring, the RFID tag can expend a lot of energy transmitting signals when the asset's location and status are not changing. It is desirable to conserve as much battery possible, to avoid buying and replacing batteries.

It is therefore an object of the invention to provide a novel method and system for power management of asset tracking systems for non-stationary assets.

SUMMARY OF THE INVENTION

There is a radio frequency identification (RFID) tag comprising an accelerometer, configured to communicate an acceleration reading of the RFID tag and a microcontroller unit (MCU), configured to transition the RFID tag through one or more states, and operably connected to the accelerometer, wherein the MCU is further configured to awaken, based on a trigger; receive, from the accelerometer, the acceleration reading of the RFID tag; calculate, based on the acceleration reading of the RFID tag, whether the RFID tag is in motion or not; and if the RFID tag is in motion then transition to an in motion state.

Transitioning to an in motion state comprises powering on essential components, such as a transceiver. Triggers may include a clock cycle timeout or another input into the RFID tag. The clock cycle timeout can be configured.

The calculating may comprise comparing the acceleration reading to a previous acceleration reading.

Transitioning to an in motion state may comprise powering down the accelerometer and MCU.

There is also a method for transitioning an RFID tag, comprising an accelerometer and a microcontroller unit (MCU), through one or more states based on its motion, comprising receiving a trigger to enter a motion detection state, determining if the RFID tag is in motion, if the RFID tag is not in motion: transitioning to an in motion state; and if the RFID tag is in motion: transitioning to a not in motion state.

Transitioning to an in motion state may comprise powering on essential components such as a transceiver.

The method of claim 8, wherein the trigger may comprise a clock cycle timeout that may be configured.

The determining may further comprise: receiving an acceleration reading, and comparing the acceleration reading to a previous acceleration reading.

The transitioning to an in motion state may comprise powering down the accelerometer and the MCU.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
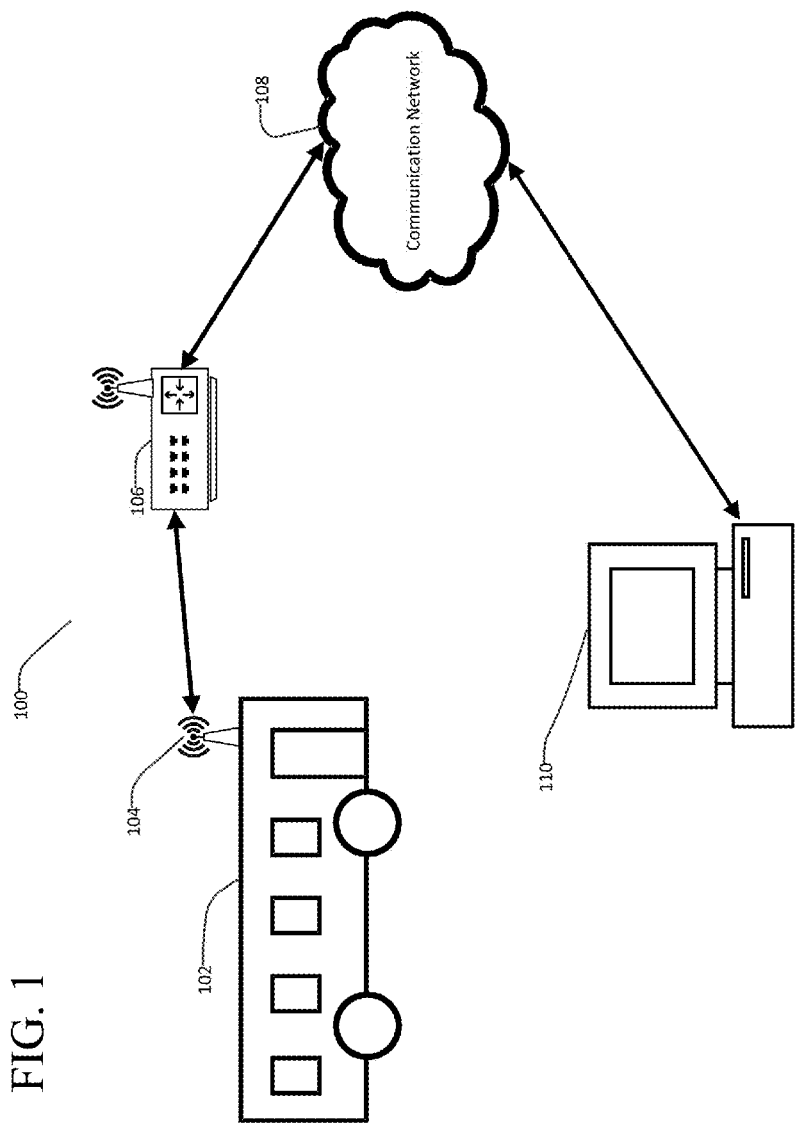
FIG. 1 shows a high-level architecture of a system for tag based asset management in accordance with an embodiment of the invention.

FIG. 1 is a high-level architecture of system 100 for a tag based asset management system comprising asset 102, further comprising tag 104, gateway 106, communication network 108 and central management system 110.

System 100 may allow one or more assets 102, tags 104 and gateways 106 to communicate with one another, for example to allow tracking of assets 102 and other related functionality of such systems. Such communication may be secured, such as encrypted, by one or more components of system 100 and may be communicated via one or more communication networks 108 or directly between components. System 100 may be used by fleet operators, transit agencies, assembly lines, manufacturing, sports, container management and the like. System 100 may allow communication between components thereof to accomplish the communication goals, while reducing power usage for one or more components thereof.

Asset 102 may be any object that a user would like to track the location and/or the status of. Asset 102 may be a vehicle that provides, or relates to the provision of, transit services that may or may not be moving. Asset 102 may comprise other components and systems (not shown) including, but not limited to, electrical, mechanical and computer systems.

Asset 102 further comprises tag 104, which may be located thereon or therein, and may be removably attached. Tag 104 may be able to retrieve and/or determine information relevant to asset 102, for example from other components of asset 102, and transmit that information to other assets or gateway 106. Tag 104 may further comprise sensors, or be operably connected to sensors, as described herein, that allow it to gather information regarding asset's 102 status.

Tag 104 enables asset 102 to communicate with system 100 to provide functionality described herein. Tag 104 may communicate in a battery-efficient way, as described herein, by selectively powering portions thereof, for example that are required to determine whether communication, or other functionality, is to occur. Tag 104 may provide protection from weather elements and handle a wide range of temperatures. Tag 104 may be powered by an onboard power source, such as battery 208, as described herein.

Gateway 106 may receive transmissions from one or more tags 104 and provide those transmissions to central management system 110 via communication network 108. Gateway 106 may communicate with one of more tags 104 simultaneously. Gateway 106 may be powered, for example, externally, through a direct connection to an electricity grid, or using an onboard power source. Gateway 106 may be removably attachable to substantially any surface and may operate in both external and internal environments. Gateways may be located at substantially any location where assets 102 need to communicate. For example, gateway 106 may be placed within a transit vehicle bay (not shown) to collect information from assets 102 within the transit vehicle bay.

Communication network 108 enables communication of information between various components of system 100 including, but not limited to, gateway 106 and central management system 110. Communication network 108 allows for a plurality of signals to be sent through its network simultaneously. Communication network 108 may be any public or private network, wired or wireless, and may be substantially comprised of one or more networks that may be able to communicate with each other. Communication network 108 may use a variety of mediums, such as cellular and WiFi networks. Communication networks 108 may not be required, for example, if components of system 100, such as gateway 106 and central management system 110 are able to communicate directly.

Central management system 110 may be a component of system 100 that provides functionality for users to operate systems or services, such as one or more transit services including a fleet of assets 102. Such functionality may include tracking the location of an asset 102, diagnosing any issues with asset 102 that may require servicing and scheduling any service work that may be required for asset 102. Central management system 110 may compile information from one or more gateways 106 via communication network 108 with other information, such as servicing work schedules and parts delivery times, for use in providing functionality of system 100 and central management server 110. Central management system 110 may also perform analysis on this information to provide users with key metrics, either in real-time or aggregated over configurable periods of time. Central management system 110 may be implemented via one or more pieces of software and may be operated by one or more users. Though it is shown in the figure as one computer, it can be composed of one or more computing and data storage devices and its functionality can be split up across these devices as appropriate. Of course central management system 110 may provide non-transit related functionality, depending on what assets 102 are involved.

Figure 2:
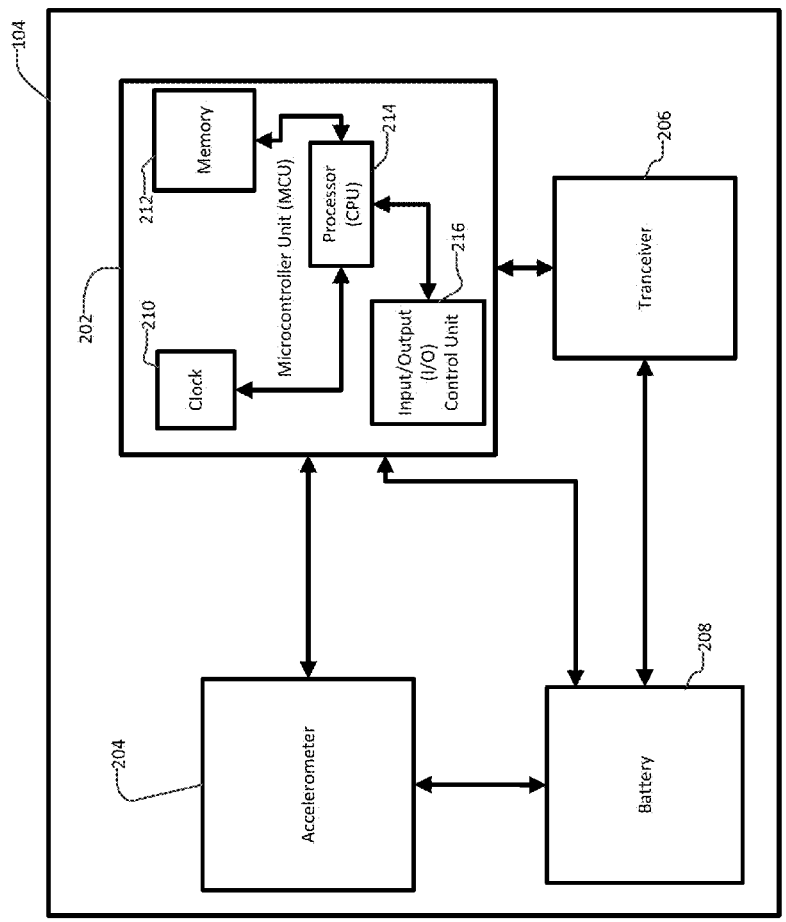
FIG. 2 shows a schematic of a tag according to an embodiment of the invention.

FIG. 2 shows a schematic of tag 104 according to an embodiment of the invention. Tag 104 may be comprised of microcontroller unit (MCU) 202, accelerometer 204 and transceiver 206, any or all of which may be operably connected, for example to allow any required communication there between. Tag 104 further comprises battery 208, which may be operably connected to the other components in tag 104 to act as a power source for these other components.

MCU 202 may control operation of tag 104, determining when tag 104 should perform specific operations, such as communication, and directing the operations of accelerometer 204 and transceiver 206. MCU 202 may toggle or transition between one or more states of operation depending on factors such as its environment, clock cycles, whether tag 104 is in motion, and the like. Such states may include: a 'sleep' state, where only enough power is being used to ensure that tag 104 can move to another state when necessary; a 'motion detection' state, where tag 104 determines if it is in motion as described herein (which may be considered an intermediary between states); and one or more full power on states, where power is provided to substantially all portions of tag 104 required to transmit data or perform other required operations (and hence transition into a "full power" state). MCU 202 may have a configurable cycle (that may be timed by clock 210) where it 'powers on' (into 'motion detection') briefly to determine whether it, and/or other components of tag 104, require power to perform operations (and hence transition into 'full power'). For example, MCU 202, at the end of a clock cycle, may leave 'sleep' and enter 'motion detection' to query accelerometer 204 to determine whether tag 104 is in motion. If it is in motion, then tag 104 may move to 'full power' and other parts of tag 104 may be powered on to allow them to perform operations as required. Alternatively if MCU 202 is not in motion then no other parts of tag 104 may be powered on, and MCU may itself return to a 'sleep' state—and tag 104 has therefore conserved significant battery life.

MCU 202 may communicate directly with one or both of accelerometer 204 and transceiver 206, sending these components operation instructions and responding to the information it receives from them. For example, on awakening from a 'sleep' state, MCU 202 may provide or direct power to accelerometer 204 and then query accelerometer 204 to determine if asset 102 is in motion (and turning power off, as appropriate based on the results of determining whether asset 102 is in motion) and optionally provide or direct power to one or more other components of tag 104, such as transceiver 206 to enable transceiver 206 to perform required operations. Transceiver 206 may only be powered on if MCU 202 powers it on directly or sends it a signal that allows it to power on. MCU 202 may also communicate with systems outside of tag 104, for example other computer systems on asset 102 (such as via I/O control unit 216), and use that information to determine what operations tag 104 should perform.

MCU 202 further comprises clock 208, memory 210, central processing unit (CPU) 212 and input/output ("I/O") control unit 216, and may comprise or house accelerometer 204 and/or transceiver 206 depending on hardware implementation details.

Accelerometer 204 can detect and measure changes in motion, for example an acceleration measurement (such as in m/s/s) and communicate with MCU 202 (such as by providing a reading). It can be awakened by MCU 202, which may send it a signal to tell accelerometer 204 to power on using battery 208, or power it on directly, and perform a motion detection reading, the results of which it can then pass along to MCU 202. Accelerometer 204 may require very little power to operate, and may return to sleep after the operation is complete, powering itself down until MCU 202 awakes it again. Accelerations measurements may be stored in memory 212, for example to use in 'motion detection' as described herein. For example, the two most recent readings may be stored, along with time stamps so that comparing acceleration readings can include how far apart the readings were taken (for example to help verify that differences actually indicate motion and a further reading is not required). It should be noted that various approaches to calculating and determining whether asset 102 is in motion, based on accelerometer 204, are contemplated herein. For example, it may be desirable to ensure that acceleration is not simply constant or zero, but that asset 102 is also not moving (ie has no velocity). In practice acceleration generally varies at least somewhat between readings despite near-constant velocity for asset 102 hence a simple approach of comparing two acceleration readings is often, though not always, employed.

Transceiver 206 allows tag 102 to communicate with system 100. Transceiver may communicate substantially any of the information tag 102 has, collects or calculates, including, for example the location of tag 102. A more common approach to location determination may be via GPS technology, and tag 102 may have such technology. However GPS has downfalls for the present applications that may make it less desirable. For example, GPS is typically more power intensive, less accurate then some circumstances required herein (such as when in a bay), and relies on being in reception with GPS satellites, which is sometimes not possible. GPS receivers also do not send their location, they only receive it, thus making further technology required to communicate as required herein. It may thus be desirable to have two or more approaches to determining location, and use the more appropriate one for the circumstances. Transceiver 206 may generate and receive signals, between other components of system 100, wirelessly. Transceiver 206 may be able to convert signals that it receives wirelessly into a medium used to transmit information to MCU 202. Transceiver 206 may also receive information from MCU 202 that may control what signals or information transceiver 206 sends, when it will send signals, and when it will listen for signals to receive. Transceiver 206 may be a low power transceiver, such as the CC1101 produced by Texas Instruments, and may be able to enter a sleep state to minimize power usage when not in operation. Transceiver 206 may be further connected to an external antenna (not shown) to enhance its wireless communication range.

Battery 208 may store power for use by some or all of the components located on tag 104. It may power these components directly and/or independently, or may be routed through MCU 202 to the other components, with MCU 202 directing when accelerometer 204 and transceiver 206 receive power. It may be a light, small battery whose usage would have to be minimized to last for long periods of times. It may be charged by an external source. Exemplary batteries 208 may include rechargeable lithium batteries (such as lithium/ion or lithium/metal), nickel, metal hydride, super-capacitors, and the like.

Clock 210 may track time and provide a stable clock signal which may be used by CPU 214, and/or other components of tag 104, to perform operations. The clock also may be directly connected to other components within tag 104. This clock may be based on a crystal oscillator, or use another technology as would be known to those of skill in the art. Clock 210 may have one or more configurable timers or clock cycle timeouts, one of which may be a trigger for tag 104 to wake up when it expires. Other timers may exist during operation as well, causing tag 104 (and/or components thereof) to perform certain activities on expiry. Such other timers may have different times or frequencies depending on, for example, whether asset 102 is in motion or not, or which state MCU 202 or tag 104 is in.

Memory 212 may allow information to be stored in tag 104. It may store or collect information from within MCU 202, or be sent information from other sources and store that information for later use by tag 104. This information can comprise programmed instructions as well as information collected by other components, and that may be used by other components, such as CPU 214. Memory 212 may comprise volatile memory such as random access memory, non-volatile memory such as varieties of read only memory, or a combination of both.

CPU 214 may control at least some of the operations of tag 104 by performing logical calculations using information it receives from the other components and instructions that may be stored in memory 212. CPU 214 may also use this information to determine what state tag 104 should be in, and may cause such state to be stored in memory 212, possibly along with other pieces of information, such as the last acceleration reading from accelerometer 204. It may determine what information should be stored in memory 212, and if information should be sent to components outside of MCU 202 using I/O control unit 216 and/or transceiver 206. CPU 214 may also determine what operations other components, inside and outside of MCU 202, should be performing, and if they should be in, or transition to, another state, such as 'sleep' state to lower power consumption.

I/O control unit 216 may send information to components outside of MCU 202, and receive information from outside components to be processed by MCU 202, which may include accelerometer 204 and transceiver 206. These outside components may be internal or external to tag 104. If the outside components are external to tag 104, the information may be sent wirelessly to the outside components from I/O control unit 216 via transceiver 206. I/O control unit 216 is in direct communication with CPU 214, which informs it as to what information to send and receives information that I/O control unit 216 collects. CPU 214 can use this information as an input into its logical calculations.

Figure 3:
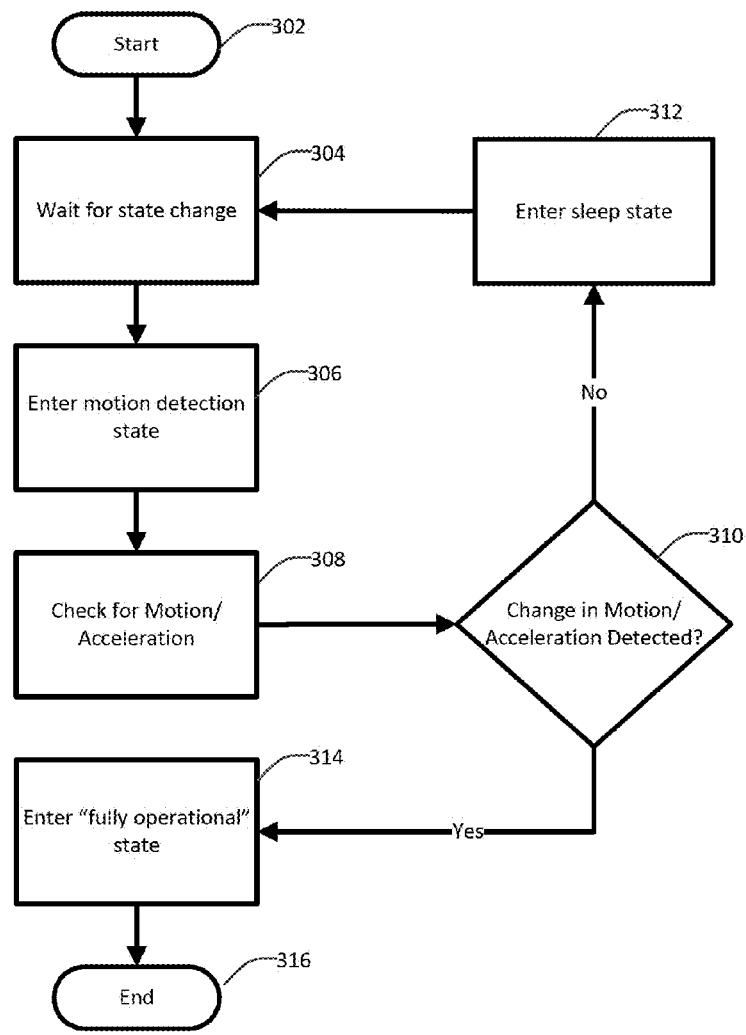
FIG. 3 is a flow chart of a method for operation of a tag on an asset to limit power consumption in operation according to an embodiment of the invention.

FIG. 3 is a flow chart of method 300 for operation of tag 104 on asset 102 to limit power consumption in operation according to an embodiment of the invention.

Method 300 allows power management for asset tracking by disabling power-intensive communication when an asset is not in motion, by returning tag 104 to a sleep state if motion is not detected. If motion is detected, then tag 104 enters a full power on state, meaning that it is ready to transmit, receive, and/or perform its other functionality. It may be desirable to return to sleep if no motion is detected as the status of asset 102 has not changed thus communication (and power use) would be wasteful for assets that can move. For example, in a transit services application, a lack of motion for a long period of time may indicate that the transit vehicle being tracked is out of service for the night, and thus power can be saved by not transmitting that information continuously throughout the night. Further, when an asset is in motion then it may need to update its status, and perform other operations, so it enters a full power state.

Of course in some implementations it may be desirable to provide power when there is no motion, as opposed to when there is. This is considered within the scope of the present invention. This may be, for example, if operation or status updates are not to occur through system 100 during motion, as an alternate system is being used to track asset 102 during these times. This may also occur if, for example, status information is stored when asset 102 is in motion, but only transmitted to gateway 106 when asset 102 is not in motion for a long period of time, signifying that it has completed its route for the day.

Method 300 begins at 302, which may be considered a "sleep" state where tag 104 may not be active or performing other operations, as described herein. This may occur, for example, when tag 104 is stationary in the transit bay. At 304 tag 104 waits to experience a state change, requiring it to exit the "sleep" state. This may be cause be one or more triggers, for example, by a delay period or timer that may be implemented by clock 210 or a signal from I/O control unit 216 (such as if a switch or pressure sensor was connected to tag 104) or accelerometer 204 as described herein. All other aspects of tag 104 that are not required for this time delay operation are, or remain, powered down.

When a state change is initiated (which may lead to transitioning from one state to another), such as after the timer has elapsed, method 300 continues at 306 to enter a motion detection state and awakens the motion detection capabilities of tag 104. This may comprise providing power from battery 208 to MCU 202 and accelerometer 204, through control by CPU 214. CPU 214 may then send a signal to accelerometer 204 via I/O control unit 216 that would direct it to collect a reading. Accelerometer 204 may then detect the acceleration currently being experienced by tag 104, and send that reading to CPU 214, which is then stored in memory 212. Although several components may be required to determine if tag 104 is moving, other components of tag 104 are not provided power and in fact tag 104 may be designed such that motion can be detected with few components, and only components that do not consume a lot of power. At 306, one or more readings may be taken from accelerometer 204 to allow 'motion detection' to be accurate.

Method 300 then continues at 308 to check if tag 104, and correspondingly asset 102, is moving. This may be done by receiving a new reading from accelerometer 204, as was done in 306, and using CPU 214 to compare this reading to the most recent previous reading from accelerometer 204 that was stored in memory 212 to determine if there is a difference. As described herein, at 308 the check may be for motion, using accelerometer 204, and not just a check for positive acceleration (as opposed to negative, which could indicate slowing or braking).

At 310 the check in 308 is used, method 300 continuing to 312 if no motion is detected and to 314 if motion is detected.

At 312 tag 104 is powered down except for the components, like clock 210, that may be required, for example to implement the timers described herein. Method 300 then returns to 304 to wait for a further state change.

At 314, tag 104 enters a "fully operational" state, powering on portions of tag 104, where power from battery 208 is supplied to the portions of tag 104 required to transmit data or perform other required operations (such components being essential components), including providing power to transceiver 206. Transmitted data may include status, location, and other information, and may be provided to gateway 106, which can then send it to central management system 110 via communication network 108.

Of course it is to be understood that, at 310, if no motion is detected method 300 may proceed to 314 instead (with motion leading to 312), if required by the context in which the invention is practiced.

In one embodiment, tag 104 may be located on asset 102 that may be a taxi car. The taxi may sometimes be used for day shifts, and sometimes for night shifts, such that it would be difficult to determine based solely on time whether the taxi is in service or not. When the taxi is in service, tag 104 may transmit status updates regarding the taxi to gateway 106 via transceiver 206. Method 300 can be used to overcome the difficulties associated with determining if the taxi is in service by deeming a taxi in motion as being in service, thus triggering status updates to be sent.

In another embodiment, tag 104 may be located on asset 102 that may be a bus used to deliver transit services. The transit operations may be such that status information for the day is stored onboard the bus and is only sent to gateway 106 when the bus is parked within a bus bay. Using a version of method 300 that triggers communication when tag 104 is not in motion, it could be determined that the bus is parked within a bus bay as it has not been in motion for a long period of time. This would lead to tag 104 becoming fully operational, allowing the stored status information to be conveyed via transceiver 206 to gateway 106.

In another embodiment, tag 104 may be located on asset 102 that may be sub-component that is to be delivered to an assembler and made part of an finished product. As such it may be desirable to use tag 104 to track the sub-component's location. For example, en route to the assembler tag 104 may not need to communicate and is thus silent while in motion. However, upon arrival at the assembler, the assembler's system (such as system 100) may need to communicate with tag 104 and hence it may be powered on when not in motion. Generally embodiments of the present invention may be useful where an RFID tag, such as tag 104, is to be used to track assets, and those assets may be in motion (and are likely to operate differently when they are in motion).

The above-described embodiment is to be an example of the present invention and alterations and modifications may be effected thereto, by those of skill in the art, without departing from the scope of the invention that is defined solely by the claims appended hereto.

What is claimed is:

1. A radio frequency identification (RFID) tag comprising: an accelerometer, configured to communicate an acceleration reading of the RFID tag; and a microcontroller unit (MCU), configured to transition the RFID tag through one or more states, and operably connected to the accelerometer, wherein the MCU is further configured to: awaken, based on a trigger, where the trigger causes the RFID to transition from a sleep state to a motion detection state; if the RFID tag is in the motion detection state then: provide temporary power to the accelerometer via the MCU only; receive, from the accelerometer, the acceleration reading of the RFID tag; calculate, based on the acceleration reading of the RFID tag, whether the RFID tag is in motion or not; and if the RFID tag is in motion then: transition to an in motion state by ceasing the temporary power provided to the accelerometer and configuring the accelerometer to receive power directly from a battery power source only; if the RFID tag is not in motion then: powering down the MCU until a next trigger and ceasing the temporary power provided to the accelerometer.

2. The system of claim 1, wherein transitioning to an in motion state comprises powering on essential components.

3. The system of claim 2, wherein the essential components comprise a transceiver.

4. The system of claim 1, wherein the trigger comprises a clock cycle timeout.

5. The system of claim 4, wherein the clock cycle timeout can be configured.

6. The system of claim 1, wherein the calculating further comprises comparing the acceleration reading to a previous acceleration reading.

* * * * *